(12) United States Patent
Varanasi (10) Patent No.: US 10,101,503 B2
(45) Date of Patent: Oct. 16, 2018

(54) ANTI-REFLECTIVE COATED GLASS ARTICLE

(71) Applicant: Pilkington Group Limited, Lathom (GB)

(72) Inventor: Srikanth Varanasi, Ottawa Hills, OH (US)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 14/884,832

(22) Filed: Oct. 16, 2015

(65) Prior Publication Data

US 2016/0124120 A1 May 5, 2016

Related U.S. Application Data

(60) Provisional application No. 62/073,167, filed on Oct. 31, 2014.

(51) Int. Cl.
| | | |
|---|---|---|
| *G02B 1/116* | (2015.01) | |
| *C03C 17/34* | (2006.01) | |
| *C09D 5/00* | (2006.01) | |
| *G02B 1/115* | (2015.01) | |
| *G06F 3/041* | (2006.01) | |

(52) U.S. Cl.
CPC .......... *G02B 1/116* (2013.01); *C03C 17/3417* (2013.01); *C09D 5/006* (2013.01); *G02B 1/115* (2013.01); *C03C 2217/734* (2013.01); *C03C 2218/1525* (2013.01); *G06F 3/041* (2013.01)

(58) Field of Classification Search
CPC ........... G02B 1/11; G02B 1/113; G02B 1/115; G02B 1/116; G02B 5/286; C03C 17/3417

USPC ........................................................ 359/581
See application file for complete search history.

(56) References Cited

U.S. PATENT DOCUMENTS

| | | | |
|---|---|---|---|
| 6,124,026 A * | 9/2000 | McCurdy | C03C 17/3417 359/359 |
| 2003/0175557 A1* | 9/2003 | Anderson | C03C 17/3417 428/698 |
| 2006/0188730 A1* | 8/2006 | Varanasi | A47F 3/0434 428/432 |
| 2007/0113881 A1 | 5/2007 | Mellott et al. | |
| 2009/0258223 A1 | 10/2009 | Ling | |
| 2010/0225882 A1 | 9/2010 | Nishimoto et al. | |
| 2013/0183489 A1* | 7/2013 | Cremer | B05D 5/063 428/141 |

(Continued)

OTHER PUBLICATIONS

Li et al. (Design, preparation, and durability of TiO2/SiO2 and ZrO2/SiO2 double-layer antireflective coatings in crystalline silicon solar modules, Solar Energy 89 {2013}, pp. 134-142).*

(Continued)

*Primary Examiner* — Kimberly N Kakalec
(74) *Attorney, Agent, or Firm* — Marshall & Melhorn, LLC (57) ABSTRACT

A coated glass article includes a glass substrate and a coating formed over the glass substrate. The coating includes a first inorganic metal oxide layer deposited over a major surface of the glass substrate. The first inorganic metal oxide layer has a refractive index of 1.8 or more. The coating also includes a second inorganic metal oxide layer deposited over the first inorganic metal oxide layer. The second inorganic metal oxide layer has a refractive index of 1.6 or less. The coated glass article exhibits a total visible light reflectance of 6.5% or less.

13 Claims, 4 Drawing Sheets

(56) References Cited

U.S. PATENT DOCUMENTS

2013/0201562 A1* 8/2013 Kawagishi .............. G02B 1/11
 359/601

OTHER PUBLICATIONS

International Search Report and Written Opinion for application No. PCT/GB2015/053080, dated Dec. 22, 2015, issued by the European Patent Office.

* cited by examiner

ANTI-REFLECTIVE COATED GLASS ARTICLE

CROSS-REFERENCE TO RELATED APPLICATION

This application is claiming the benefit, under 35 U.S. C. 119(e), of the provisional application which was granted Ser. No. 62/073,167 and filed on Oct. 31, 2014, the entire disclosure of which is hereby incorporated by reference.

BACKGROUND OF THE INVENTION

The invention relates to a coated glass article having an anti-reflective coating. More particularly, the invention relates to a coated glass article having an anti-reflective coating that exhibits a high sheet resistance.

Touch screen electronic devices include screens which are made of glass. Excessive glare from the touch screen can make the electronic device unreadable and difficult to use. Reducing the glare from the viewing screen would improve the readability and usability of the device.

Thin-film coatings on glass are commonly utilized to provide specific visible light transmittance properties. Such coatings may be designed to be anti-reflective in order to reduce visible light reflectance. Typically, the reduction in reflectance is achieved by the principle of optical interference. When light impinges on the air-film, film-film, and film-glass interfaces, a portion of the beam is reflected at each interface. By proper choice of materials and thicknesses, the individual reflected light beams can destructively interfere with each other thereby reducing the observed visual reflectance.

It would be advantageous to provide a coated glass article having an anti-reflective coating that could be utilized as a touch screen in an electronic device. For certain applications, it would also be desirable for the coated glass article to exhibit a high sheet resistance.

BRIEF SUMMARY OF THE INVENTION

Embodiments of a coated glass article are provided.

In an embodiment, the coated glass article comprises a glass substrate and a coating formed over the glass substrate. The coating comprises a first inorganic metal oxide layer deposited over a major surface of the glass substrate. The first inorganic metal oxide layer has a refractive index of 1.8 or more. The coating also comprises a second inorganic metal oxide layer deposited over the first inorganic metal oxide layer. The second inorganic metal oxide layer has a refractive index of 1.6 or less. The coated glass article exhibits a total visible light reflectance of 6.5% or less.

In another embodiment, the coated glass article comprises a glass substrate and a coating formed over the glass substrate. The coating comprises a first inorganic metal oxide layer deposited over a major surface of the glass substrate. The first inorganic metal oxide layer has a refractive index of 1.8 or more and is deposited at a thickness of 50 nm or less. A second inorganic metal oxide layer is deposited directly on the first inorganic metal oxide layer. The second inorganic metal oxide layer has a refractive index of 1.6 or less and is deposited at a thickness of 100 nm or more. A third inorganic metal oxide layer is deposited directly on the major surface of the glass substrate. The third inorganic metal oxide layer has a refractive index of 1.6 or less and is deposited at a thickness of 25 nm or less. The coated glass article exhibits a total visible light reflectance of 6.0% or less, a total visible light transmittance of 94% (Illuminant C) or more, and a sheet resistance of $1.0 \times 10^7$ ohm/sq. or more.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific layers, articles, methods and processes illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

Embodiments of a coated glass article 10, 10A in accordance with the invention will be described below. The embodiments of the coated glass article 10, 10A may be utilized as a single coated glass sheet. For example, the coated glass article 10, 10A may be utilized as a portion of a touch screen for an electronic device or in other electronic interface devices. Also, the embodiments of the coated glass article 10, 10A may be utilized in combination in, for example, a laminated glass unit. Additionally, the embodiments of the coated glass article 10, 10A may be utilized singularly or in combination in, for example, a glazing and/or have architectural, residential, commercial, photovoltaic, automotive and aerospace applications.

Figure 1:
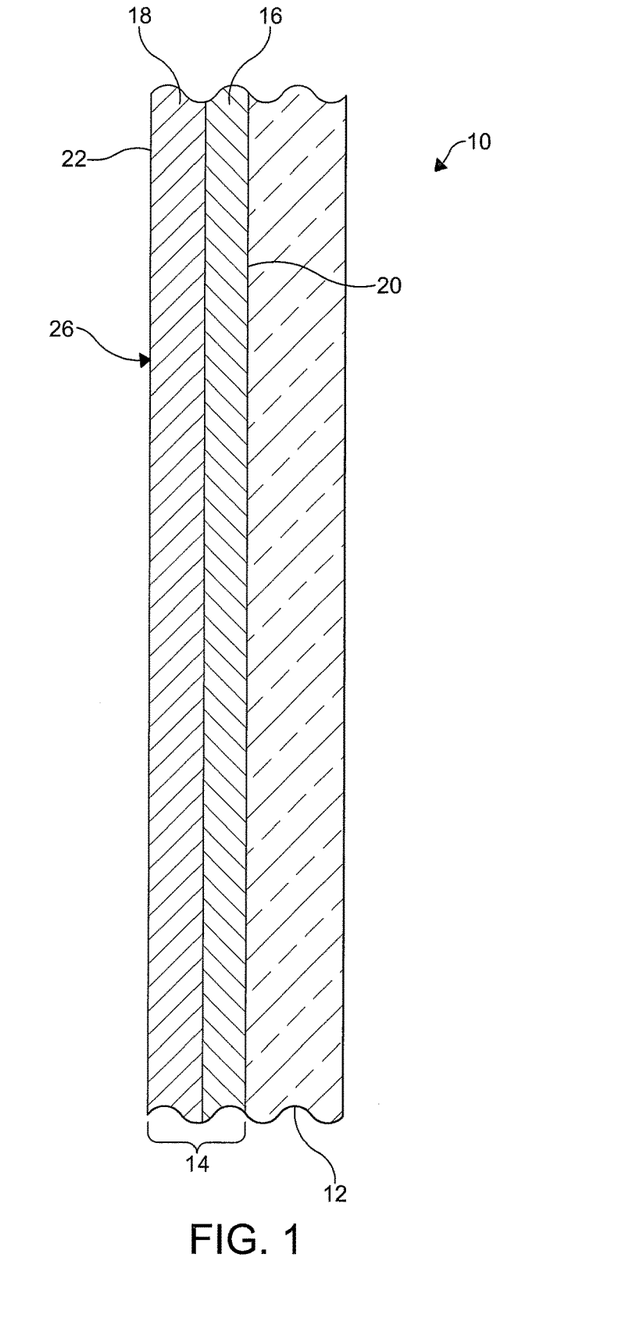
FIG. 1 is a sectional view of an embodiment of a coated glass article in accordance with the invention.
Figure 2:
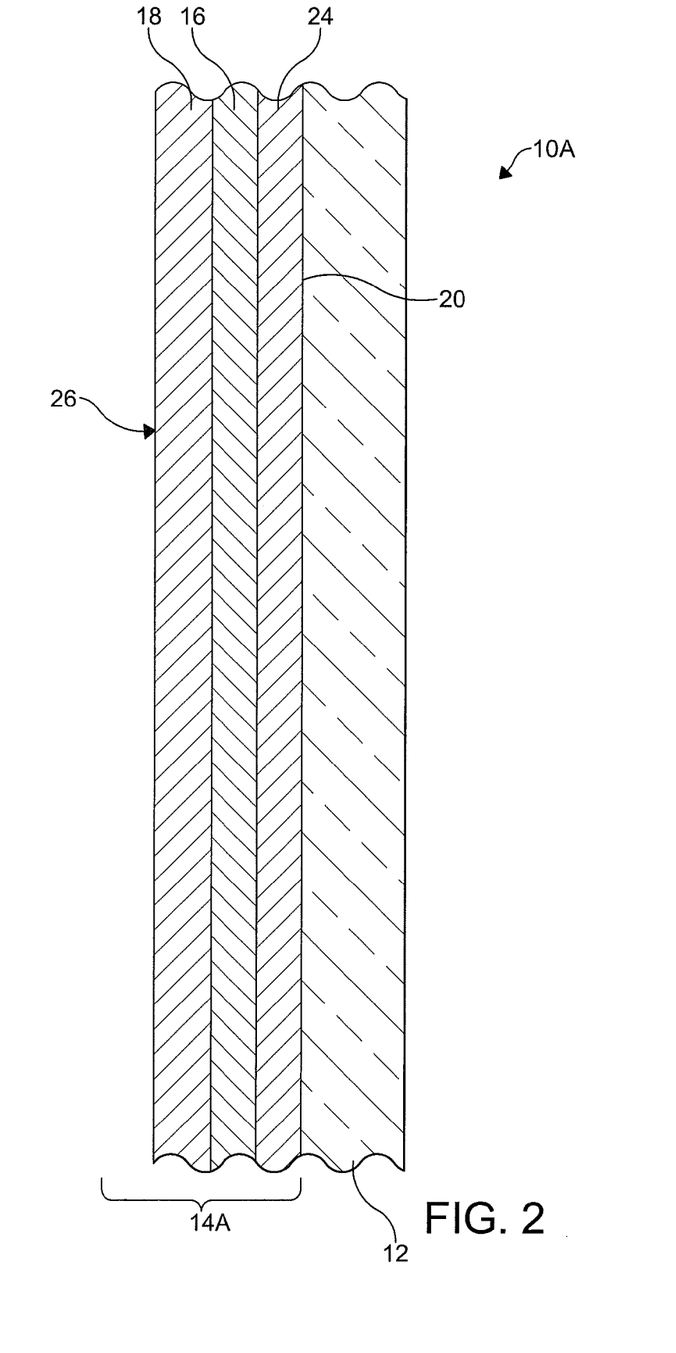
FIG. 2 is a sectional view of another embodiment of a coated glass article in accordance with the invention.

FIGS. 1-2 illustrate embodiments of the coated glass article 10, 10A.

As illustrated in FIGS. 1-2, the coated glass article 10, 10A comprises a glass substrate 12. The glass substrate 12 may be of any of the conventional glass compositions known in the art. In certain embodiments, the composition of the glass substrate 12 is selected to allow the coated glass article 10, 10A to exhibit certain specific spectral properties. Preferably, the glass substrate 12 is a soda-lime-silica glass. In this embodiment, the substrate 12 may be a float glass ribbon. The glass substrate 12 may be substantially transparent to visible light. In an embodiment, the glass substrate 12 is clear and of a low-iron composition. However, the glass substrate may be of another composition such as, for example, a borosilicate composition. Also, the transparency or absorption characteristics of the glass substrate may vary between embodiments of the coated glass article. For example, a tinted glass substrate may be utilized in the coated glass article.

The glass substrate thickness may vary between embodiments of the coated glass article. However, in certain embodiments such as, for example, when the coated glass article is utilized in a touchscreen electronic device, it is preferred that the glass substrate 12 is of a thickness which is selected to provide a balance between the weight and the rigidity of the article. Preferably, in these embodiments, the thickness of the glass substrate 12 is selected to be 6 millimeters (mm) or less. More preferably, in these embodiments, the thickness of the glass substrate 12 is selected to be 2 millimeters (mm) or less. In still further embodiments, the thickness of the glass substrate 12 is between about 1.0 and 2.0 mm. More particularly, in an embodiment, the thickness of the glass substrate 12 is between 1.5 and 1.7 mm.

A coating 14, 14A is deposited over the glass substrate 12. The coating 14, 14A comprises a first coating layer 16 and a second coating layer 18. In certain embodiments, the coating 14, which is illustrated in FIG. 1, consists of the aforementioned coating layers 16, 18. The coating layers 16, 18 may be deposited by any suitable method but are preferably deposited by atmospheric chemical vapor deposition (APCVD). Other known deposition methods are suitable for depositing one or more of the coating layers such as, for example, sol-gel coating techniques or sputter coating techniques. In embodiments where the substrate 12 is a float glass ribbon, the coating 14, 14A is preferably applied in the heated zone of the float glass process.

The first coating layer 16 is deposited over, and in certain embodiments, directly on, a major surface 20 of the glass substrate 12. In certain embodiments, the first coating layer 16 is a pyrolytic coating. Preferably, the first coating layer 16 has a refractive index which is greater than 1.6. More preferably, the first coating layer 16 has a refractive index which is 1.8 or more. Also, for certain embodiments, it is preferred that the first coating layer 16 is of a material which has relatively high electrical resistance.

In certain embodiments, the first coating layer 16 is formed of an inorganic metal oxide. Preferably, in these embodiments, the first coating layer 16 comprises tin oxide ($SnO_2$), titanium dioxide ($TiO_2$) or another suitable inorganic metal oxide. When the first coating layer 16 comprises an inorganic metal oxide layer of tin oxide, the refractive index is 1.8 or more and, when the first coating layer 16 comprises an inorganic metal oxide layer of titanium dioxide, the refractive index is 2.2 or more. Tin oxide and titanium dioxide are preferred materials because of their relative high refractive indices and their relative high electrical resistance. Therefore, it should be appreciated that for these embodiments it is preferred that the electrical resistance of the first coating layer not be reduced by, for example, adding a dopant such as fluorine or another material to the first coating layer 16. As such, when the first coating layer 16 comprises tin oxide, it is preferred that the first coating layer 16 is undoped and comprises tin, oxygen, and possibly trace amounts or less of contaminants such as, for example, carbon and, when the first coating layer 16 comprises titanium dioxide, it is preferred that the first coating layer 16 is undoped and comprises titanium, oxygen, and possibly trace amounts or less of contaminants such as, for example, carbon.

The thickness of the first coating layer 16 is 50 nanometers (nm) or less. Preferably, the thickness of the first coating layer 16 is 40 nm or less. More preferably, the thickness of the first coating layer 16 is 35 nm or less. In still other embodiments, the thickness of the first coating layer 16 is 30 nm or less. In embodiments where the first coating layer 16 comprises titanium dioxide, the thickness of the first coating layer 16 may be 20 nm or less.

In embodiments where the first coating layer 16 comprises tin oxide, the thickness of the first coating layer 16 may be 15-50 nm. Preferably, in these embodiments, the thickness of the first coating layer 16 is 15-35 nm. In embodiments where the first coating layer 16 comprises titanium dioxide, the thickness of the first coating layer 16 may be 5-20 nm. In other embodiments where the first coating layer 16 comprises titanium dioxide, the thickness of the first coating layer 16 may be 15 nm or less. In these embodiments, the thickness of the first coating layer is preferably 5-15 nm.

The second coating layer 18 is deposited over, and preferably directly on, the first coating layer 16. Preferably, the second coating layer 18 forms the outermost layer and an outermost surface 22 of the coated glass article 10. Also, in certain embodiments, the second coating layer 18 is a pyrolytic coating.

Preferably, the second coating layer 18 has a refractive index which is lower than the refractive index of the first coating layer 16. In an embodiment, the second coating layer 18 has a refractive index which is 1.6 or less and, preferably, 1.5 or less. In certain embodiments, it is preferred that the second coating layer 18 has relatively high electrical resistance.

In an embodiment, the second coating layer 18 is formed of an inorganic metal oxide with a low refractive index. Preferably, in this embodiment, the second coating layer 18 comprises silicon dioxide ($SiO_2$). Silicon dioxide is a preferred material for the second coating layer 18 because of its refractive index of about 1.46. Also, silicon dioxide is a preferred material because of its relative high electrical resistance. When the second coating layer 18 comprises silicon dioxide, it is preferred that the second coating layer 18 comprises silicon, oxygen, and possibly trace amounts or less of contaminants such as, for example, carbon.

In embodiments where the second coating layer 18 comprises an inorganic metal oxide layer of silicon dioxide, the thickness of the second coating layer 18 is 100 nm or more. Preferably, in these embodiments, the thickness of the second coating layer 18 is 100-125 nm. More preferably, in embodiments where the second coating layer 18 is a layer of silicon dioxide, the thickness of the second coating layer 18 is 110 nm or more. Even more preferably, in these embodiments, the thickness of the second coating layer 18 is 110-125 nm.

In an embodiment like the one illustrated in FIG. 2, the coating 14A comprises a third coating layer 24. In certain embodiments, the coating 14A, which is illustrated in FIG. 2, consists of the first coating layer 16, the second coating layer 18, and the third coating layer 24. The third coating layer 24 may be deposited by any suitable method but is preferably deposited by atmospheric chemical vapor deposition (APCVD). In certain embodiments, the third coating layer 24 is a pyrolytic coating. Other known deposition methods are suitable for depositing the third coating layer such as, for example, sol-gel coating techniques or sputter coating techniques.

The third coating layer 24 is deposited over, and preferably directly on, the major surface 20 of the glass substrate 12. In the embodiment illustrated in FIG. 2, the first coating layer 16 is deposited over, and preferably, directly on, the third coating layer 24. Thus, in this embodiment, the third coating layer 24 forms the innermost layer of the coating 14A.

Preferably, the third coating layer 24 has a refractive index which is lower than the refractive index of the first coating layer 16. In an embodiment, the third coating layer 24 has a refractive index which is 1.6 or less and, preferably, 1.5 or less. In certain embodiments, it is preferred that the third coating layer 24 has relatively high electrical resistance.

In an embodiment, the third coating layer 24 is formed of an inorganic metal oxide with a low refractive index. Preferably, in this embodiment, the third coating layer 24 comprises silicon dioxide ($SiO_2$). Silicon dioxide is a preferred material for the third coating layer 24 because of its refractive index of about 1.46. Also, silicon dioxide is a preferred material because of its relative high electrical resistance. When the third coating layer 24 comprises silicon dioxide, it is preferred that the third coating layer 24 comprises silicon, oxygen, and possibly trace amounts or less of contaminants such as, for example, carbon. Preferably, the thickness of the third coating layer 24 is 25 nm or less. In embodiments where the third coating layer 24 comprises an inorganic metal oxide layer of silicon dioxide, the thickness of the third coating layer 18 is preferably 20 nm or less. More preferably, in these embodiments, the thickness of the third coating layer 24 is 10-20 nm.

Advantageously, the embodiments of the coated glass article 10, 10A exhibit anti-reflective properties such as low total visible light reflectance. For describing the coated glass article 10, 10A, total visible light reflectance refers to the percentage of visible light reflected from the coated glass article as measured from the side 26 of the article that has the coating deposited on the surface of the glass substrate. In an embodiment, the coated glass article 10, 10A exhibits a total visible light reflectance of 6.5% or less. Preferably, the coated glass article 10, 10A exhibits a total visible light reflectance of 6.0% or less. More preferably, the coated glass article 10, 10A exhibits a total visible light reflectance of 5.5% or less. In certain embodiments, the coated glass article 10, 10A exhibits a total visible light reflectance of 5% or less. The coated glass article exhibits a total visible light reflectance of, for example, 6.5% or less by proper selection of the composition and thickness of each of the first coating layer and the second coating layer.

The coated glass article 10, 10A also exhibits a high sheet resistance of, for example, greater than $1.0 \times 10^5$ ohm/sq. Preferably, the coated glass article 10, 10A exhibits a sheet resistance of $1.0 \times 10^7$ ohm/sq. or more. In certain embodiments, the coated glass article 10, 10A exhibits a sheet resistance of $1.0 \times 10^8$ ohm/sq. or more. The coated glass article exhibits a sheet resistance of, for example, greater than $1.0 \times 10^5$ ohm/sq. by proper selection of the composition and thickness of each of the first coating layer and the second coating layer.

The coated glass article 10, 10A may also exhibit other properties which in certain applications are advantageous. For example, it should also be noted that the coated glass article 10, 10A not only exhibits a reduced total visible light reflectance but may also exhibit a neutral reflected color for the visible light reflected from the coated side 26 of the article when viewed at a 90 degree angle incident from the article. For the purpose of describing the embodiments of the coated glass article 10, 10A disclosed herein, a neutral color for the light reflected or transmitted is defined under the CIELAB color scale system with an a* value in the range of about 6 to about −6 and a b* value in the range of about 6 to −6. It should also be noted that, for certain embodiments or applications described herein, a non-neutral reflected and/or transmitted color may be desirable and can be exhibited by the coated glass article. In certain embodiments, the reflected color from the coated side 26 of the article 10, 10A is in a range from about 4 to about 10 for the a* value and a range from about −2 to about −22 for the b* value.

Also, the coated glass article 10, 10A may exhibit a high total visible light transmittance. For describing the coated glass article, total visible light transmittance refers to the percentage of visible light which passes through the article as measured from the side of the article that has the coating deposited on the surface of the glass substrate. In certain embodiments, the coated glass article 10, 10A exhibits a total visible light transmittance of 93% (Illuminant C) or more. Preferably, the coated glass article 10, 10A exhibits a total visible light transmittance of 94% (Illuminant C) or more. More preferably, the total visible light transmittance of the coated glass article 10, 10A is 95% (Illuminant C) or more. In still other embodiments, the coated glass article 10, 10A exhibits a haze value of below 0.6%. More preferably, the coated glass article 10, 10A may exhibit a haze value of 0.3% or less.

Figure 3:
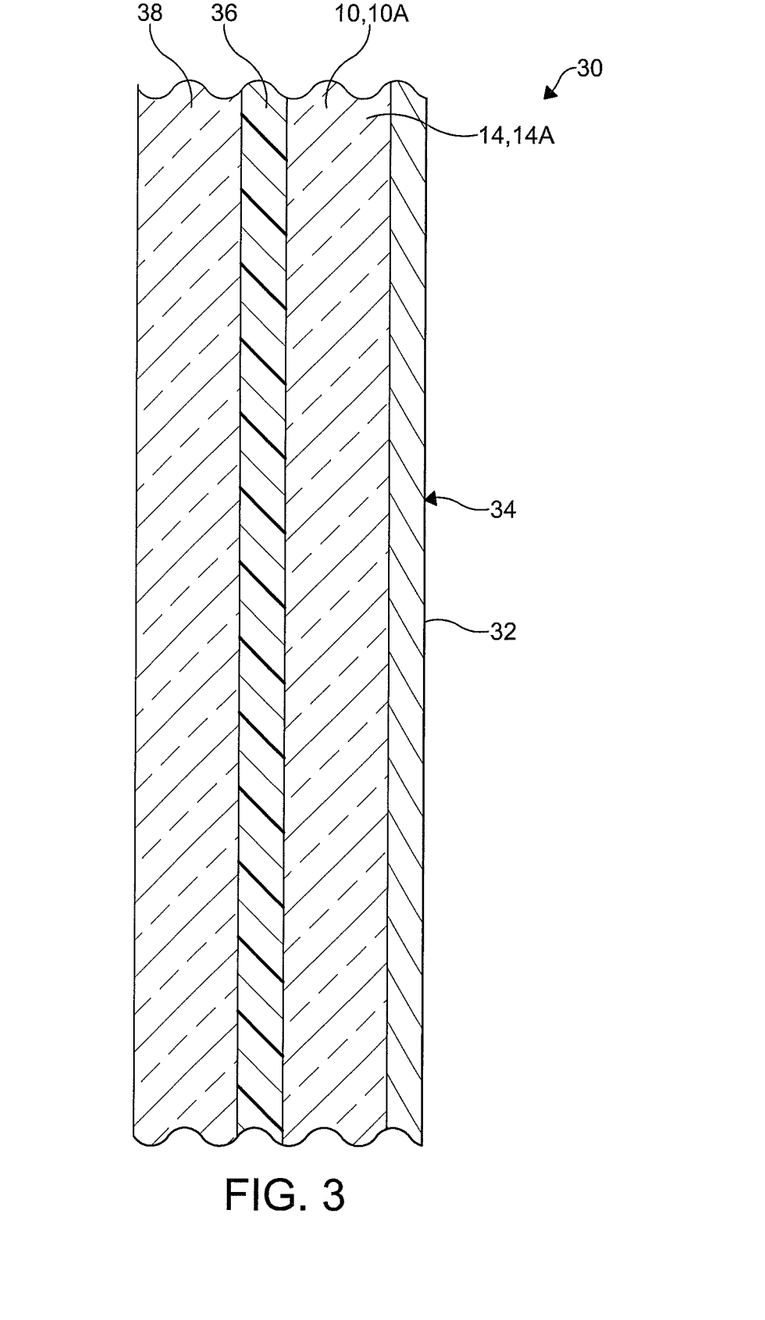
FIG. 3 is a sectional view of an embodiment of a laminated glass unit in accordance with the invention.

In certain embodiments like the one illustrated in FIG. 3, the coated glass article 10, 10A is utilized in a laminated glass unit 30. The laminated glass unit 30 may be utilized in a glazing, a touch screen electronic device, or in another suitable application. Advantageously and due to the presence of the coating 14, 14A, the laminated glass unit 30 exhibits anti-reflective properties such as low total visible light reflectance. The laminated glass unit may also exhibit other properties which in certain applications are advantageous. For example, due to the presence of the coating 14, 14A, an outer surface 32 of the laminated glass unit 30 may exhibit a high sheet resistance. Additionally, the laminated glass unit 30 may exhibit a neutral reflected color for the visible light reflected from and/or transmitted through the unit when viewed at a 90 degree angle incident from a coated side 34 of the unit 30. It should also be noted that, for certain embodiments or applications described herein, a non-neutral reflected and/or transmitted color may be desirable and can be exhibited by the laminated glass unit. Also, the laminated glass unit 30 may exhibit a high total visible light transmittance.

Preferably, the laminated glass unit 30 also comprises a polymeric interlayer 36. The polymeric interlayer 36 is provided between the coated glass article 10, 10A and a second glass article 38. In certain embodiments, the second glass article 38 may be one of the embodiments of the coated glass article 10, 10A. In other embodiments, the second glass article 38 may be an uncoated glass article or a coated glass article that includes a coating which is different from the embodiments of the coating 14, 14A described above. In these embodiments, the second glass article 38 may comprise a glass substrate which is as described above for the glass substrate 12 of the coated glass article 10, 10A.

The interlayer 36 can be formed of any suitable polymeric material. Preferably, such suitable polymeric materials will, when properly heated and pressed between the coated glass article 10, 10A and the second glass article 38 be virtually transparent. Examples of such suitable polymeric materials are polyvinyl butyral and polyvinyl chloride. Optionally, the polymeric interlayer may be coated or otherwise treated so that it exhibits solar control properties.

Figure 4:
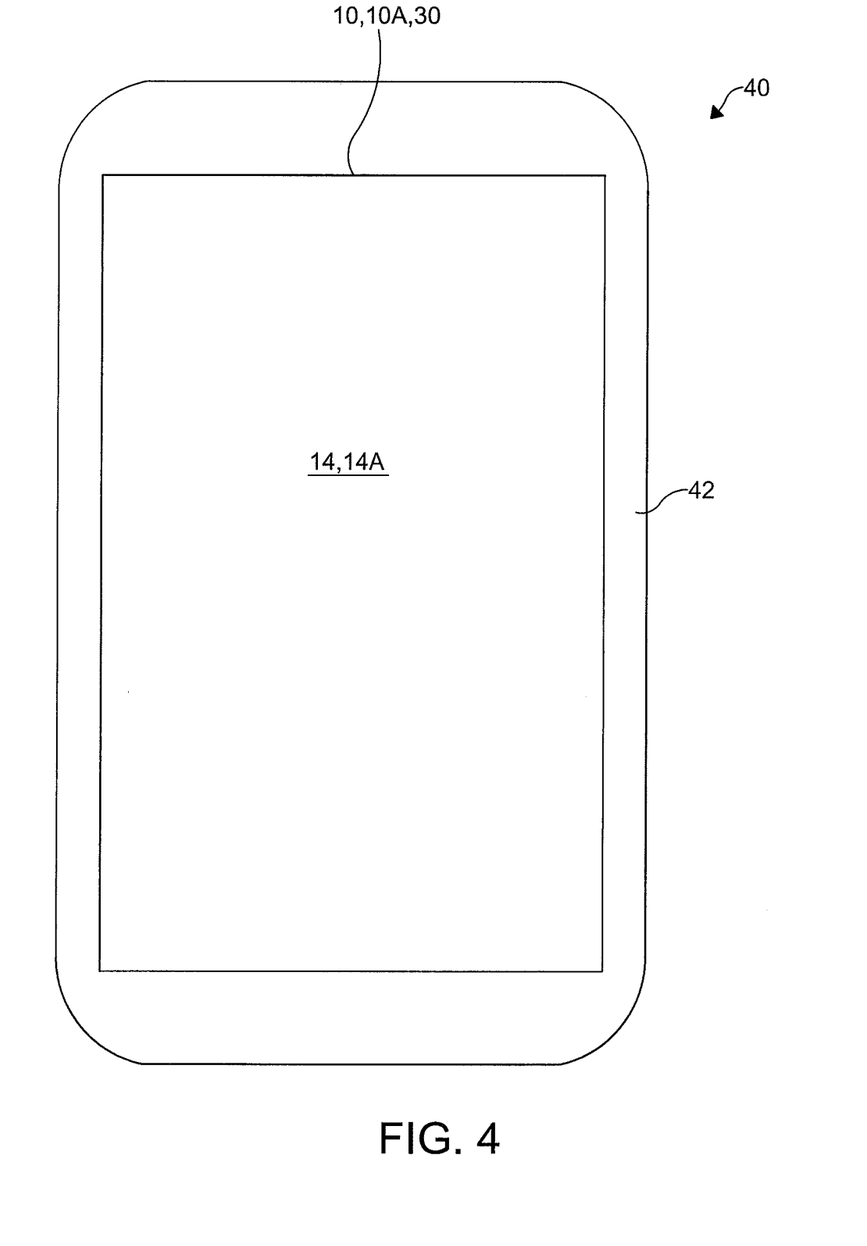
FIG. 4 is a front view of an embodiment of a touch screen electronic device in accordance with the invention.

In other embodiments like the one illustrated in FIG. 4, the coated glass article 10, 10A is utilized in a touch screen electronic device 40. Alternatively, as illustrated in FIG. 4, the laminated glass unit 30 may be utilized in the touch screen electronic device 40. The touch screen electronic device 40 may also comprise a housing 42. The housing 42 is utilized to secure the coated glass article 10, 10A, or the laminated glass unit 30, and the other components of the touch screen electronic device 40 together.

The touch screen electronic device 40 may be of the projected capacitance touch, optical, or the infrared variety. In these embodiments and as illustrated in FIG. 4, the coating 14, 14A faces out from the device 40. As such, when the touch screen electronic device 40 is in use, the user controls the device 40 by touching the coating 14, 14A.

EXAMPLES

The following examples are presented solely for the purpose of further illustrating and disclosing the embodiments of the coated glass article, the laminated glass unit, and the touch screen electronic device.

Examples of coated glass articles within the scope of the invention are described below and illustrated in TABLEs 1-5.

In TABLEs 1-5, the coated glass articles within the scope of the invention are Ex 1-Ex 55.

The following experimental conditions are applicable to Ex 1-Ex 9. For Ex 1-Ex 9, a coating was deposited on a deposition surface of a glass substrate as the glass substrate was being formed and moving in conjunction with the float glass manufacturing process. The glass substrate was of a soda-lime-silica composition. The thickness of the glass substrate was 1.6 mm. The coating was formed by depositing a first coating layer and a second coating layer. Each coating layer was formed by utilizing an APCVD process.

For Ex 1-Ex 9, the first coating layer was an inorganic metal oxide layer comprising pyrolytic tin oxide. The tin oxide coating layer was deposited directly on the glass substrate. After depositing the first coating layer, the second coating layer was deposited. The second coating layer was an inorganic metal oxide layer comprising pyrolytic silicon dioxide. The silicon dioxide coating layer was deposited directly on the first coating layer.

Thus, the coated glass articles of Ex 1-Ex 9 are of a glass/$SnO_2$/$SiO_2$ arrangement. The thicknesses of the first coating layer and second coating layer of Ex 1-Ex 9 are reported in TABLE 1 in nanometers and were calculated via optical modeling. The sheet resistance ($R_s$), total visible light reflectance (Rf), reflected color (Ra*, Rb*), total visible light transmittance (Tvis) and haze of the coated glass articles of Ex 1-Ex 9 are reported in TABLE 1. The total visible light reflectance and reflected color were measured on the coating side of the coated glass article using a spectrophotometer. The total visible light reflectance is expressed as a percentage. The total visible light transmittance was also measured using a spectrophotometer and is expressed as a percentage. The haze was measured on the coating side of the coated glass article using a haze meter and is expressed as a percentage. The sheet resistance was measured using a resistivity test fixture and is expressed in ohm/sq.

TABLE 1

| Examples | $SnO_2$ | $SiO_2$ | $R_s$ | Rf | Ra* | Rb* | Tvis | Haze |
|---|---|---|---|---|---|---|---|---|
| Ex 1 | 30.0 | 104.5 | $2.61 \times 10^7$ | 5.38 | 6.48 | −2.68 | 95.1 | 0.15 |
| Ex 2 | 30.2 | 109.8 | $5.18 \times 10^7$ | 5.16 | 7.25 | −6.91 | 95.3 | 0.15 |
| Ex 3 | 28.9 | 116.9 | $1.93 \times 10^7$ | 5.15 | 8.16 | −13.23 | 95.3 | 0.18 |
| Ex 4 | 28.1 | 115.1 | $6.10 \times 10^7$ | 5.04 | 7.62 | −11.8 | 95.4 | 0.18 |
| Ex 5 | 29.5 | 115.4 | $8.32 \times 10^7$ | 5.09 | 7.53 | −14.6 | 95.3 | 0.23 |
| Ex 6 | 28.1 | 120.4 | $4.32 \times 10^7$ | 5.36 | 7.1 | −19.1 | 95.1 | 0.2 |
| Ex 7 | 28.9 | 118.1 | $6.61 \times 10^7$ | 5.05 | 7.57 | −12.5 | 95.4 | 0.22 |

TABLE 1-continued

| Examples | $SnO_2$ | $SiO_2$ | $R_s$ | Rf | Ra* | Rb* | Tvis | Haze |
|---|---|---|---|---|---|---|---|---|
| Ex 8 | 29.4 | 120.2 | $1.25 \times 10^8$ | 5.06 | 7.39 | −15 | 95.4 | 0.17 |
| Ex 9 | 27.8 | 119.4 | $1.65 \times 10^8$ | 5.35 | 7.08 | −18.9 | 95.1 | 0.21 |

As shown in TABLE 1, the coated glass articles of Ex1-Ex 9 exhibit anti-reflective properties. For example, the coated glass articles of Ex 1-Ex 9 all exhibited a total visible light reflectance from the coated side of the glass substrate of less than 6%. Advantageously, the coated glass articles of Ex 1-Ex 9 all exhibited a total visible light reflectance of less than 5.5%. Even more preferably, the total visible light reflectance exhibited by the coated glass articles of Ex 4 and Ex 7 is about 5%. By comparison, the visible light reflectance from an uncoated glass substrate having a soda-lime-silica composition is typically about 7-8%.

Additionally, the coated glass articles of Ex 1-Ex 9 exhibited other properties which are advantageous. For example, the coated glass articles of Ex 1-Ex 9 all exhibited a sheet resistance of greater than $1.0 \times 10^5$ ohm/sq. In fact, the coated glass articles of Ex 1-Ex 9 all exhibited a sheet resistance of greater than $1.0 \times 10^7$ ohm/sq. In certain embodiments, such as the coated glass articles of Ex 8 and Ex 9, a sheet resistance of more than $1.0 \times 10^8$ ohm/sq. was exhibited. The high sheet resistances exhibited by the coated glass articles of Ex 1-Ex 9 are advantageous when, for example, the coated glass article is utilized in certain electronic device applications.

Furthermore, for Ex 1-Ex 9, the coated glass articles exhibited a visible light transmittance above 95% (Illuminant C). Also, the coated glass articles of Ex 1-Ex 9 exhibited haze of less than 0.3%. For the coated glass articles of Ex 1-Ex 4, Ex 6 and Ex 8 a haze of 0.2% or less was exhibited.

Additional examples of coated glass articles within the scope of the invention are described below and illustrated in TABLE 2. In TABLE 2, coated glass articles within the scope of the invention are Ex 10-Ex 31.

The coated glass articles of Ex 10-Ex 31 are predictive and were modeled utilizing input parameters similar to those reported for Ex 1-Ex 9. Each of the coated glass articles of Ex 10-Ex 31 comprised a glass substrate. Each glass substrate had a thickness of 1.6 mm and a soda-lime-silica composition. Each of the coated glass articles of Ex 10-Ex 31 also comprised a coating deposited on a deposition surface of the glass substrate. Each coating comprised a first coating layer and a second coating layer.

For each of the of the coated glass articles of Ex 10-Ex 31, the first coating layer is deposited on the glass substrate and is an inorganic metal oxide layer comprising tin oxide. The thicknesses of the first coating layers are as reported in TABLE 2. The second coating layer is deposited on the first coating layer and is an inorganic metal oxide layer comprising silicon dioxide. The thicknesses of the second coating layers are as reported in TABLE 2.

Thus, the coated glass articles of Ex 10-Ex 31 are of a glass/$SnO_2$/$SiO_2$ arrangement. The thicknesses of the coating layers of Ex 10-Ex 31 are reported in TABLE 2 in nanometers. The total visible light reflectance (Rf), reflected color (Ra*, Rb*) and total visible light transmittance (Tvis) of the coated glass articles of Ex 10-Ex 31 are also reported in TABLE 2. The total visible light reflectance, reflected color and total visible light transmittance of the coated glass articles of Ex 10-Ex 31 were calculated by optical modeling.

The total visible light reflectance and reflected color are reported for the coating side of the coated glass article. The total visible light reflectance and the total visible light transmittance are expressed as percentages.

TABLE 2

| Examples | $SnO_2$ | $SiO_2$ | Rf | Ra* | Rb* | Tvis |
|---|---|---|---|---|---|---|
| Ex 10 | 22.5 | 120 | 5.2 | 5.3 | −9.1 | 94.48 |
| Ex 11 | 23.0 | 120 | 5.1 | 5.5 | −9.4 | 94.49 |
| Ex 12 | 23.5 | 120 | 5.1 | 5.6 | −9.8 | 94.51 |
| Ex 13 | 24.0 | 120 | 5.1 | 5.7 | −10.1 | 94.52 |
| Ex 14 | 24.5 | 120 | 5.1 | 5.8 | −10.5 | 94.53 |
| Ex 15 | 25.0 | 120 | 5.1 | 5.9 | −10.9 | 94.54 |
| Ex 16 | 25.5 | 120 | 5.1 | 6.0 | −11.2 | 94.54 |
| Ex 17 | 26.0 | 120 | 5.1 | 6.1 | −11.6 | 94.55 |
| Ex 18 | 26.5 | 120 | 5.1 | 6.2 | −12.0 | 94.55 |
| Ex 19 | 27.0 | 120 | 5.0 | 6.3 | −12.3 | 94.56 |
| Ex 20 | 27.5 | 120 | 5.0 | 6.4 | −12.7 | 94.56 |
| Ex 21 | 25.0 | 108 | 5.3 | 5.3 | −2.2 | 94.30 |
| Ex 22 | 25.0 | 110.4 | 5.2 | 5.5 | −4.0 | 94.41 |
| Ex 23 | 25.0 | 112.8 | 5.2 | 5.8 | −5.8 | 94.48 |
| Ex 24 | 25.0 | 115.2 | 5.1 | 5.9 | −7.6 | 94.53 |
| Ex 25 | 25.0 | 117.6 | 5.1 | 6.0 | −9.3 | 94.55 |
| Ex 26 | 25.0 | 120 | 5.1 | 5.9 | −10.9 | 94.54 |
| Ex 27 | 25.0 | 122.4 | 5.1 | 5.8 | −12.3 | 94.50 |
| Ex 28 | 25.0 | 124.8 | 5.2 | 5.6 | −13.7 | 94.43 |
| Ex 29 | 25.0 | 127.2 | 5.3 | 5.4 | −14.9 | 94.34 |
| Ex 30 | 25.0 | 129.6 | 5.4 | 5.0 | −15.9 | 94.22 |
| Ex 31 | 25.0 | 132.0 | 5.5 | 4.6 | −16.8 | 94.08 |

As shown in TABLE 2, the coated glass articles of Ex 10-Ex 31 exhibit anti-reflective properties. As illustrated by the coated glass articles of Ex 10-Ex 31 exhibited a visible light reflectance from the coated side of the glass substrate of 6% or less. In fact, the coated glass articles of Ex 10-Ex 31 exhibited a visible light reflectance from the coated side of the glass substrate of 5.5% or less. Additionally, the coated glass articles of Ex 19 and Ex 20 exhibited a visible light reflectance from the coated side of the glass substrate of 5% or less.

Also, the coated glass articles of Ex 10-Ex 31 exhibit other properties which are advantageous. For Ex 10-Ex 31, the coated glass articles exhibited visible light transmittance above 94% (Illuminant C). Further, the coated glass articles of Ex 21-Ex 23 exhibited a neutral color in reflection. It is also expected that the sheet resistances of the coated glass articles of Ex 10-Ex 31 would be $1.0 \times 10^7$ ohm/sq. or more.

An additional example, Ex 32, of a coated glass article within the scope of the invention is described below and illustrated in TABLE 3.

The following experimental conditions are applicable to Ex 32. For Ex 32, a coating was deposited on a deposition surface of a glass substrate as the glass substrate was being formed and moving in conjunction with the float glass manufacturing process. The glass substrate was of a soda-lime-silica composition. The thickness of the glass substrate was 3.2 mm. The coating was formed by depositing a first coating layer and a second coating layer. Each coating layer was formed by utilizing an APCVD process.

For Ex 32, the first coating layer was an inorganic metal oxide layer comprising pyrolytic titanium dioxide. The titanium dioxide coating layer was deposited directly on the glass substrate. After depositing the first coating layer, the second coating layer was deposited. The second coating layer was an inorganic metal oxide layer comprising pyrolytic silicon dioxide. The silicon dioxide coating layer was deposited directly on the first coating layer.

Thus, the coated glass article of Ex 32 is of a glass/$TiO_2$/$SiO_2$ arrangement. The thicknesses of the first coating layer and second coating layer of Ex 32 are reported in TABLE 3 in nanometers and were calculated via optical modeling. The sheet resistance ($R_s$), total visible light reflectance (Rf), reflected color (Ra*, Rb*), total visible light transmittance (Tvis) and haze of the coated glass article of Ex 32 is also reported in TABLE 3.

TABLE 3

| Examples | $TiO_2$ | $SiO_2$ | $R_s$ | Rf | Ra* | Rb* | Tvis | Haze |
|---|---|---|---|---|---|---|---|---|
| Ex 32 | 11.0 | 102.1 | $5.03 \times 10^{14}$ | 5.19 | 5.33 | −8.56 | 95.2 | 0.14 |

As shown in TABLE 3, the coated glass article of Ex 32 exhibited anti-reflective properties having a visible light reflectance from the coated side of the glass substrate of less than 6.0%. In fact, the coated glass article of Ex 32 exhibited a visible light reflectance from the coated side of the glass substrate of less than 5.5%. Also, the coated glass article of Ex 32 exhibited other properties which are advantageous. For example, the coated glass article of Ex 32 exhibited a visible light transmittance above 95% (Illuminant C) and a sheet resistance of more than $1.0 \times 10^{14}$ ohm/sq. Also, the coated glass article of Ex 32 exhibited haze of less than 0.2%.

Additional examples of coated glass articles within the scope of the invention are described below and illustrated in TABLE 4. In TABLE 4, coated glass articles within the scope of the invention are Ex 33-Ex 54.

The coated glass articles of Ex 33-Ex 54 are predictive and were modeled utilizing input parameters similar to those reported for Ex 1-Ex 9. Each of the coated glass articles of Ex 33-Ex 54 comprised a glass substrate. Each glass substrate had a thickness of 1.6 mm and a soda-lime-silica composition. Each of the coated glass articles of Ex 33-Ex 54 also comprised a coating deposited on a deposition surface of the glass substrate. Each coating comprised a first coating layer and a second coating layer.

For each of the of the coated glass articles of Ex 33-Ex 54, the first coating layer is deposited on the glass substrate and is an inorganic metal oxide layer comprising titanium dioxide. The thicknesses of the first coating layers are as reported in TABLE 4. The second coating layer is deposited on the first coating layer and is an inorganic metal oxide layer comprising silicon dioxide. The thicknesses of the second coating layers are as reported in TABLE 4.

Thus, the coated glass articles of Ex 33-Ex 54 are of a glass/$TiO_2$/$SiO_2$ arrangement. The thicknesses of the coating layers of Ex 33-Ex 54 are reported in TABLE 4 in nanometers. The total visible light reflectance (Rf), reflected color (Ra*, Rb*) and total visible light transmittance (Tvis) of the coated glass articles of Ex 33-Ex 54 are also reported in TABLE 4. The total visible light reflectance, reflected color and total visible light transmittance of the coated glass articles of Ex 33-Ex 54 were calculated by optical modeling. The total visible light reflectance and reflected color are reported for the coating side of the coated glass article. The total visible light reflectance and the total visible light transmittance are expressed as percentages.

TABLE 4

| Examples | $TiO_2$ | $SiO_2$ | Rf | Ra* | Rb* | Tvis |
|---|---|---|---|---|---|---|
| Ex 33 | 10.8 | 120 | 5.0 | 7.7 | −11.77 | 94.76 |
| Ex 34 | 11.04 | 120 | 5.0 | 7.9 | −12.2 | 94.77 |

TABLE 4-continued

| Examples | TiO$_2$ | SiO$_2$ | Rf | Ra* | Rb* | Tvis |
|---|---|---|---|---|---|---|
| Ex 35 | 11.28 | 120 | 5.0 | 8.1 | −12.7 | 94.78 |
| Ex 36 | 11.52 | 120 | 5.0 | 8.3 | −13.2 | 94.78 |
| Ex 37 | 11.76 | 120 | 5.0 | 8.5 | −13.8 | 94.78 |
| Ex 38 | 12.0 | 120 | 5.0 | 8.7 | −14.3 | 94.78 |
| Ex 39 | 12.24 | 120 | 5.0 | 8.9 | −14.8 | 94.78 |
| Ex 40 | 12.48 | 120 | 5.0 | 9.1 | −15.3 | 94.77 |
| Ex 41 | 12.72 | 120 | 5.0 | 9.3 | −15.9 | 94.76 |
| Ex 42 | 12.96 | 120 | 5.1 | 9.5 | −16.4 | 94.75 |
| Ex 43 | 13.2 | 120 | 5.1 | 9.7 | −16.9 | 94.74 |
| Ex 44 | 12.0 | 112.5 | 5.6 | 6.7 | −2.7 | 93.83 |
| Ex 45 | 12.0 | 115.0 | 5.4 | 7.3 | −5.1 | 94.07 |
| Ex 46 | 12.0 | 117.5 | 5.3 | 7.8 | −7.5 | 94.27 |
| Ex 47 | 12.0 | 120.0 | 5.1 | 8.2 | −9.8 | 94.44 |
| Ex 48 | 12.0 | 122.5 | 5.1 | 8.6 | −12.1 | 94.58 |
| Ex 49 | 12.0 | 125.0 | 5.0 | 8.7 | −14.3 | 94.68 |
| Ex 50 | 12.0 | 127.5 | 5.0 | 8.8 | −16.3 | 94.75 |
| Ex 51 | 12.0 | 130.0 | 5.1 | 8.7 | −18.1 | 94.78 |

TABLE 4-continued

| Examples | TiO$_2$ | SiO$_2$ | Rf | Ra* | Rb* | Tvis |
|---|---|---|---|---|---|---|
| Ex 52 | 12.0 | 132.5 | 5.1 | 8.5 | −19.7 | 94.78 |
| Ex 53 | 12.0 | 135.0 | 5.2 | 8.1 | −21.1 | 94.74 |
| Ex 54 | 12.0 | 137.5 | 5.4 | 7.7 | −22.3 | 94.66 |

As shown in TABLE 4, the coated glass articles of Ex 33-Ex 54 exhibit anti-reflective properties. As illustrated by the coated glass articles of Ex 33-Ex 54 exhibited a visible light reflectance from the coated side of the glass substrate of 6% or less. In fact, the coated glass articles of Ex 33-Ex 43 and Ex 45-Ex 54 exhibited a visible light reflectance from the coated side of the glass substrate of 5.5% or less. Additionally, the coated glass articles of Ex 33-41 and Ex 49-Ex 50 exhibited a visible light reflectance from the coated side of the glass substrate of 5% or less.

Also, the coated glass articles of Ex 33-Ex 54 exhibit other properties which are advantageous. For example, the coated glass articles of Ex 33-Ex 54 each exhibited a visible light transmittance of 93% (Illuminant C) or more. In fact, the coated glass articles of Ex 33-Ex 43 and Ex 45-Ex 54 each exhibited a visible light transmittance above 94% (Illuminant C). Further, it is expected that the sheet resistances of the coated glass articles of Ex 33-Ex 54 would be $1.0 \times 10^7$ ohm/sq. or more.

An additional example, Ex 55, of a coated glass article within the scope of the invention is described below and illustrated in TABLE 5.

The following experimental conditions are applicable to Ex 55. For Ex 55, a coating was deposited on a deposition surface of a glass substrate as the glass substrate was being formed and moving in conjunction with the float glass manufacturing process. The glass substrate was of a soda-lime-silica composition. The thickness of the glass substrate was 3.2 mm. The coating was formed by depositing a first inorganic metal oxide coating layer, a second inorganic metal oxide coating layer and a third inorganic metal oxide coating layer. Each inorganic metal oxide coating layer was formed by utilizing an APCVD process.

For Ex 55, the coated glass article is of a glass/SiO$_2$/SnO$_2$/SiO$_2$ arrangement. The inorganic metal oxide layer deposited directly on the glass substrate comprised pyrolytic silicon dioxide. After depositing the layer of silicon dioxide on the glass substrate, an inorganic metal oxide layer comprising pyrolytic tin dioxide was deposited. After depositing the layer of tin dioxide, another inorganic metal oxide layer comprising pyrolytic silicon dioxide was deposited directly on the tin oxide layer.

The thicknesses of the coating layers of Ex 55 are reported in TABLE 5 in nanometers and were calculated via optical modeling. The sheet resistance (R$_s$), total visible light reflectance (Rf), reflected color (Ra*, Rb*), total visible light transmittance (Tvis) and haze of the coated glass article of Ex 55 is also reported in TABLE 5.

TABLE 5

| Examples | SiO$_2$ | TiO$_2$ | SiO$_2$ | R$_s$ | Rf | Ra* | Rb* | Tvis | Haze |
|---|---|---|---|---|---|---|---|---|---|
| Ex 55 | 15.0 | 28.1 | 101.4 | $6.79 \times 10^8$ | 5.18 | 4.50 | −6.88 | 95.1 | 0.10 |

As shown in TABLE 5, the coated glass article of Ex 55 exhibited anti-reflective properties having a visible light reflectance from the coated side of the glass substrate of less than 6.0%. In fact, the coated glass article of Ex 55 exhibited a visible light reflectance from the coated side of the glass substrate of less than 5.5%. Also, the coated glass article of Ex 55 exhibited other properties which are advantageous. For example, the coated glass article of Ex 55 exhibited a visible light transmittance above 95% (Illuminant C) and a sheet resistance of more than $1.0 \times 10^8$ ohm/sq. Also, the coated glass article of Ex 32 exhibited haze of less than 0.2%.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention.

The invention claimed is:
1. A coated glass article comprising:
   a glass substrate; and
   a pyrolytic coating deposited over the glass substrate, wherein the coating comprises:
   i. a first inorganic metal oxide layer deposited directly on a major surface of the glass substrate, wherein the first inorganic metal oxide layer comprises titanium dioxide and has a refractive index of 2.2 or more,
   ii. a second inorganic metal oxide layer deposited directly on the first inorganic metal oxide layer, wherein the second inorganic metal oxide layer comprises silicon dioxide, is deposited at a thickness of 100 nm or more, and has a refractive index of 1.6 or less,
   wherein the coated glass article exhibits a total visible light reflectance of 6.5% or less.
2. The coated glass article of claim 1, wherein the first inorganic metal oxide layer and the second inorganic metal oxide layer are selected so that the coated glass article exhibits a sheet resistance of greater than $1.0 \times 10^5$ ohm/sq.

3. The coated glass article of claim 2, wherein the coated glass article exhibits a sheet resistance of $1.0 \times 10^7$ ohm/sq. or more.

4. The coated glass article of claim 1, wherein the coated glass article exhibits a total visible light transmittance of 94% (Illuminant C) or more.

5. The coated glass article of claim 1, wherein the first inorganic metal oxide layer is deposited at a thickness of 5-20 nm.

6. The coated glass article of claim 5, wherein the first inorganic metal oxide layer is deposited at a thickness of 5-15 nm.

7. The coated glass article of claim 1, wherein the second inorganic metal oxide layer is deposited at a thickness of 100-125 nm.

8. The coated glass article of claim 7, wherein the second inorganic metal oxide layer is deposited at a thickness of 110-125 nm.

9. The coated glass article of claim 1, wherein the coating consists of the first inorganic metal oxide layer and the second inorganic metal oxide layer, the second inorganic metal oxide layer forming an outermost surface of the coated glass article.

10. The coated glass article of claim 1, wherein the total visible light reflectance exhibited by the coated glass article is 6.0% or less.

11. A laminated glass unit, the laminated glass unit comprising a coated glass article according to claim 1.

12. A touch screen electronic device, the touch screen electronic device comprising a coated glass article according to claim 1.

13. A coated glass article comprising:
   a glass substrate; and
   a pyrolytic coating deposited over the glass substrate, wherein the coating comprises:
   i. a first inorganic metal oxide layer deposited directly on a major surface of the glass substrate, wherein the first inorganic metal oxide layer is deposited at a thickness of 5-20 nm and comprises titanium dioxide, the first inorganic metal oxide layer having a refractive index of 2.2 or more,
   ii. a second inorganic metal oxide layer deposited directly on the first inorganic metal oxide layer, wherein the second inorganic metal oxide layer comprises silicon dioxide, is deposited at a thickness of 100 nm or more, and has a refractive index of 1.6 or less,
   wherein the coated glass article exhibits a total visible light reflectance of 6.5% or less and a sheet resistance of $1.0 \times 10^7$ ohm/sq. or more.

* * * * *